July 7, 1936.  S. H. KNIGHT  2,046,387
PARACHUTE ASSEMBLAGE
Filed March 2, 1934   6 Sheets-Sheet 1
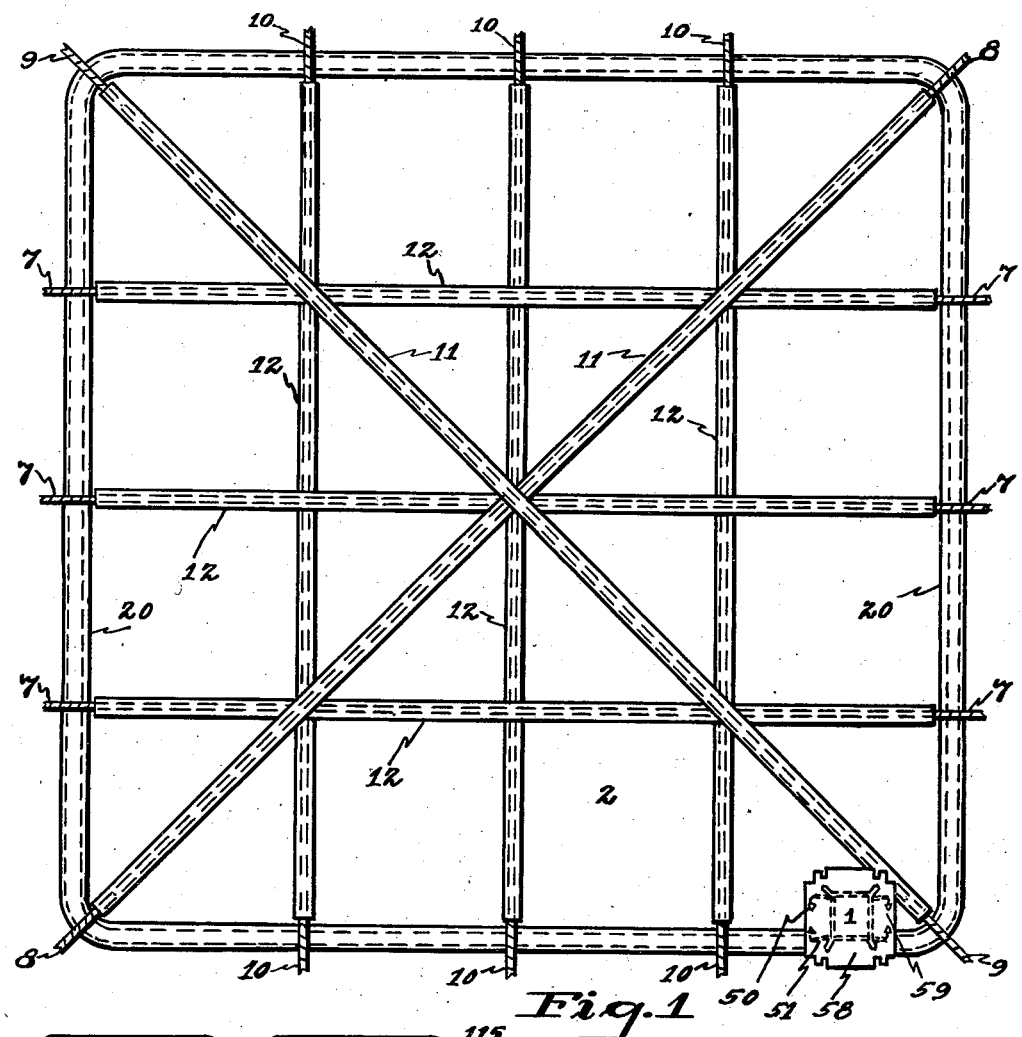
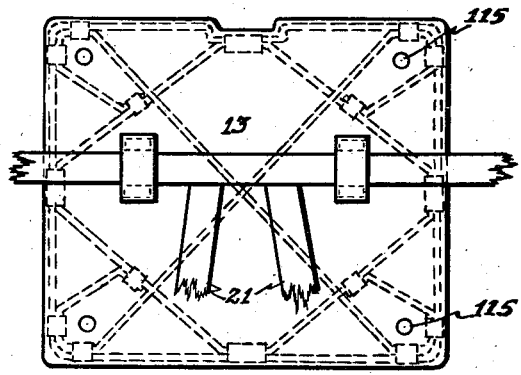
INVENTOR.
Samuel H. Knight
BY Mark W. Collet
ATTORNEY.

July 7, 1936.  S. H. KNIGHT  2,046,387
PARACHUTE ASSEMBLAGE
Filed March 2, 1934  6 Sheets-Sheet 2

INVENTOR.
Samuel H. Knight
BY Mark C. Collet
ATTORNEY.

July 7, 1936.  S. H. KNIGHT  2,046,387
PARACHUTE ASSEMBLAGE
Filed March 2, 1934   6 Sheets—Sheet 3

INVENTOR.
Samuel H. Knight
BY Mark W. Collet
his ATTORNEY.

July 7, 1936.   S. H. KNIGHT   2,046,387
PARACHUTE ASSEMBLAGE
Filed March 2, 1934   6 Sheets-Sheet 4

INVENTOR.
Samuel H. Knight
BY Mark W. Collet
ATTORNEY.

July 7, 1936.　　S. H. KNIGHT　　2,046,387
PARACHUTE ASSEMBLAGE
Filed March 2, 1934　　6 Sheets-Sheet 5

INVENTOR.
Samuel H. Knight
BY Mark W. Colect,
his ATTORNEY.

July 7, 1936.  S. H. KNIGHT  2,046,387
PARACHUTE ASSEMBLAGE
Filed March 2, 1934  6 Sheets-Sheet 6

INVENTOR.
Samuel H. Knight
BY Mark W. Collet
ATTORNEY.

Patented July 7, 1936

2,046,387

UNITED STATES PATENT OFFICE 2,046,387

PARACHUTE ASSEMBLAGE

Samuel H. Knight, Lancaster, Pa.

Application March 2, 1934, Serial No. 713,647

11 Claims. (Cl. 244—21)

The parachute described in the present specification is self protecting and requires only a support to which it may be attached in order to be carried by the wearer and be protected against damage. It requires no pack or sack or other container. It comprises a parachute canopy, a portion of which covers and encloses the parachute assembly when the latter and the load ropes are folded up. This portion of the canopy is of a flexible material, substantial and strong enough to protect the rest of the fabric of the canopy, and sufficient in size to cover the folded assembly. The support upon and by which this canopy is carried may and in practice is, the aviator's cushion. A suitable set of fastening devices that are releasable by the pull of the rip cord, secure the canopy to the support. If the support is rigid enough, these are the only elements required. Ordinarily, however, a stiffener is used to give the needful rigidity to the support. This stiffener may have also the function of an extender, giving to the assemblage not only a permanent form but also regulating the relative positions of the parts forming the detachable connections between the fastening devices which are composed of sets of co-operating parts, one co-operating element of each set of fastening devices being placed upon the support and the other co-operating element of the set being attached permanently to the canopy.

The device I use in practice, besides using this generally described assemblage, has many other features that are of great value. The stiffener, that may give rigidity and the shape to the bundle formed by the folded parachute, may have no permanent connections with either the aviator's cushion or to the canopy and may be held in position between the folded parachute and the cushion by the releasable fasteners that may extend through it; between the cushion and the canopy, which are entirely disconnected with it and hold it only so long as the cushion and the canopy are fastened together. These fasteners are, in practice, locking cones that pass through registering retainers on skirts attached at their one side to the canopy and free at their other side, and through retainers secured at the inner side of the aviator's cushion or through some other support, and are prevented from withdrawing by locking pins attached to branches of the rip cord that are permanently connected to the support (in a seat assemblage this support may be the aviator's cushion). These cones are urged in the withdrawal direction by an elastic member, anchored at one end on a part of the canopy and in tension when the locking pin is inserted in the cone, or by a compression spring suitably placed or any other practicable elastic means for ejecting the cone from the elements it holds.

My assemblage does not require any part that will interfere with the immediate opening of the parachute canopy. If, in what I believe is the best and most complete form of my device, locking cones, that hold the canopy to the support, are withdrawn by springing means that remain under tension or compression while the locking cones are retained in position by the locking pins, as soon as the pins are pulled out, nothing will obstruct the immediate separation of the parachute from its support.

The canopy, as I have shown it in the drawings, and the canopy described in detail is the square canopy that has the enclosing portion at the edge of the canopy, but I do not confine myself to this form of canopy, nor to the positioning and arrangement of the load ropes shown and described in the detail portion of this specification. The form of fastenings by which the support is connected to the body of the aviator may be greatly varied, according to the position the parachute assemblage occupies on the aviator's person, and while the invention is described in detail as an assemblage on which the aviator sits, my invention is not confined to such positioning of the assemblage and may easily be adapted to be worn on either the aviator's back or chest. However, the features described in detail have their particular merit and I do not disclaim my right to the features described in detail, because I have said that equivalents for various assemblages and parts described in my detailed description may be used in other parachute assemblages without departing from my invention.

Describing now in detail the best form of my device of which I am at present aware:—

Fig. 1 is a top plan view of a canopy.

Fig. 11 is a sketch of a modified form of stiffener.

Figure 5:
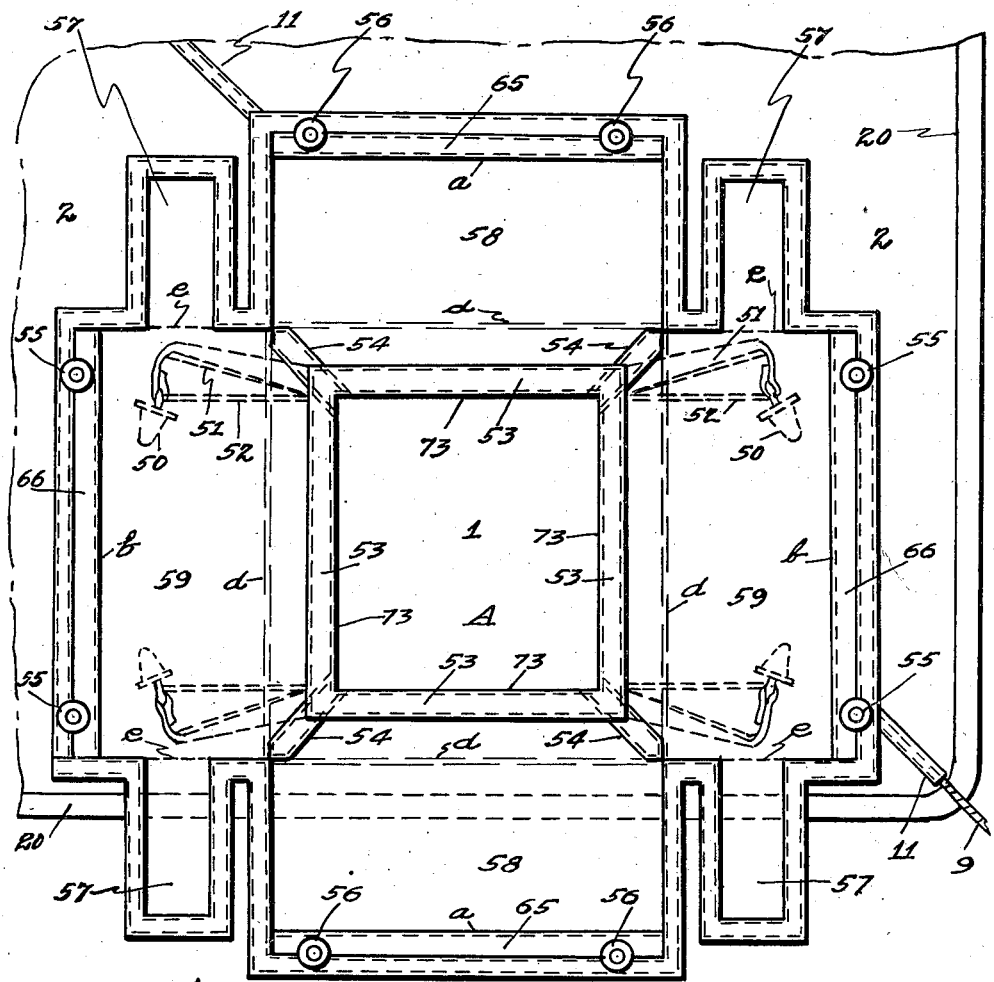
Fig. 5 is a view of the reinforcing portion of the canopy and a portion of the fasteners on a larger scale than shown in Fig. 1.
Figure 7:
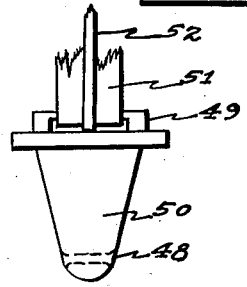
Fig. 7 is an enlarged view of a locking cone and its attachments.
Figure 8:
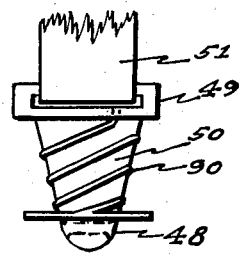
Fig. 8 is a modification of the device shown in Fig. 7.
Figure 10:
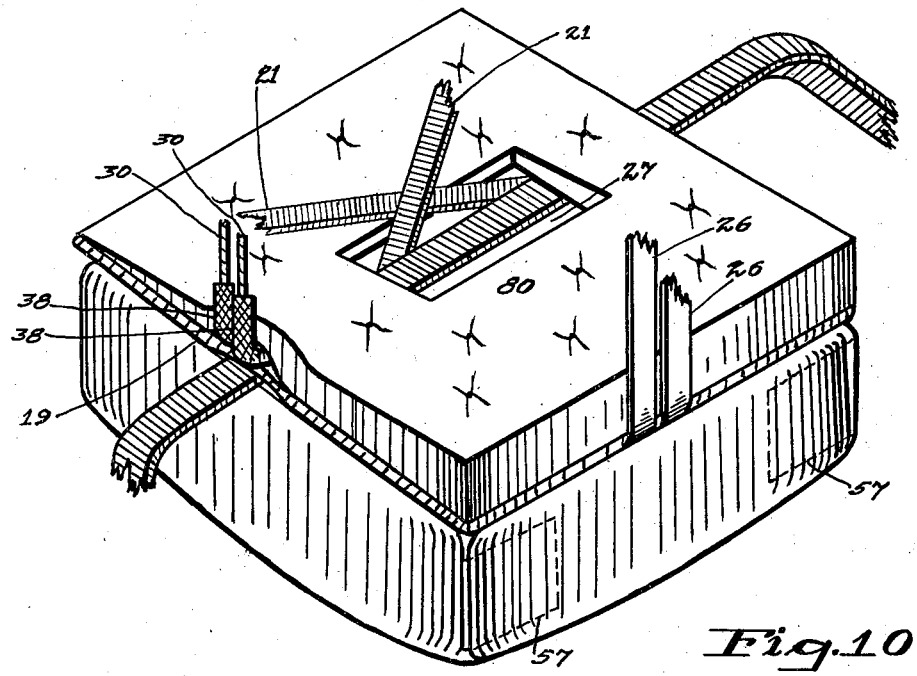
Fig. 10 is an isometric perspective view of the entire device.
Figure 9:
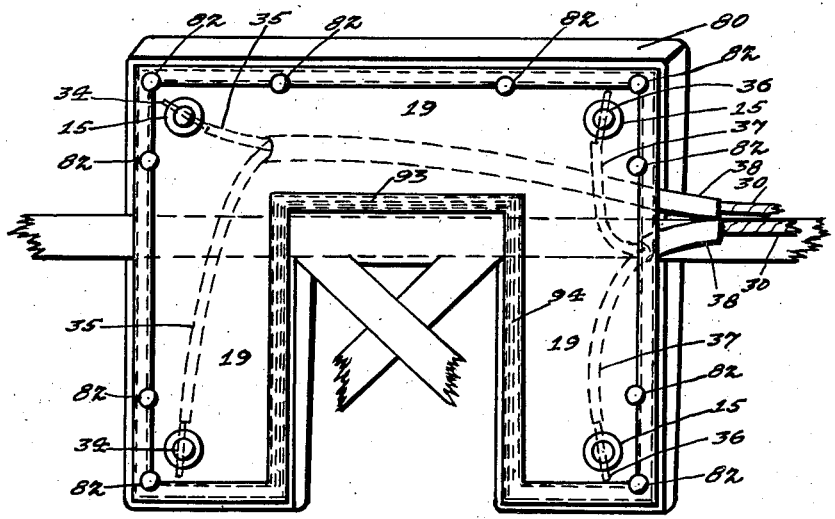
Fig. 9 is a variation of the device shown in Fig. 2.
Figure 12:
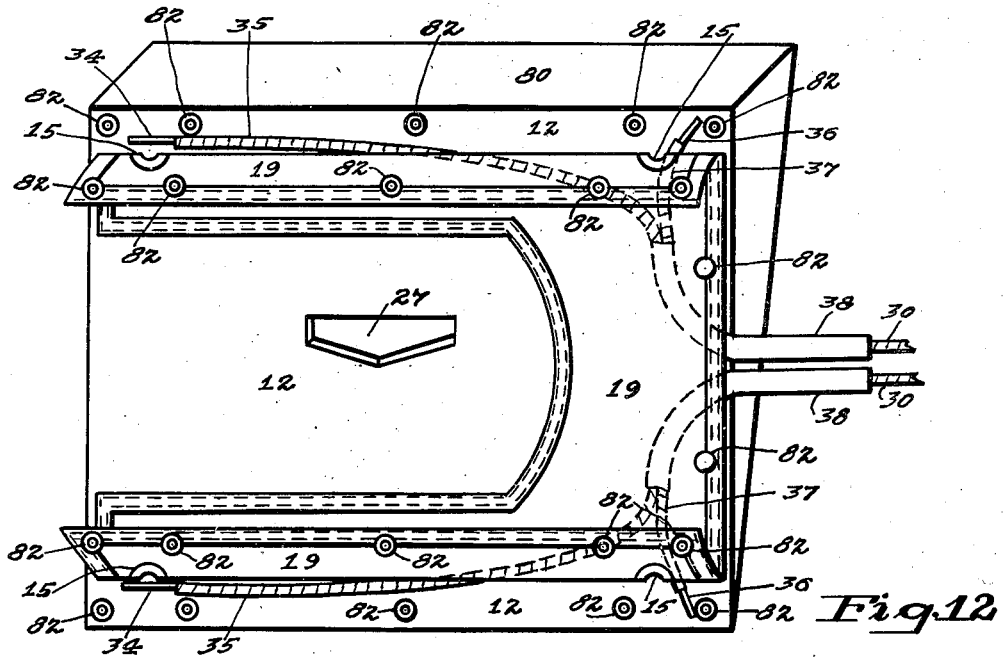
Fig. 12 is a bottom plan of the aviator's cushion showing portions of the release device which it carries to support the parachute.
Figure 13:
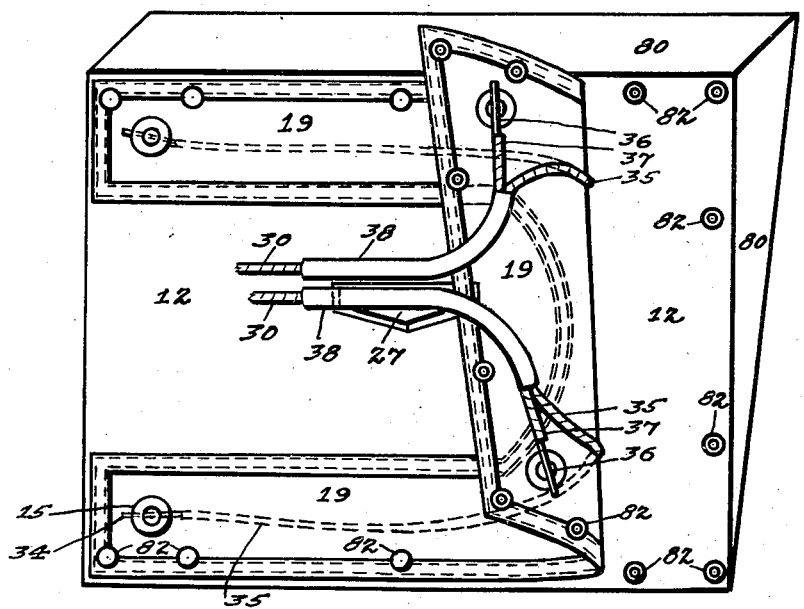
Fig. 13 is a bottom plan of the aviator's cushion showing other portions of release device.

The parachute canopy, 2, has a protecting upper surface placed adjacent to the periphery of the canopy. It has a central portion A that is permanently secured to or forms a portion of the canopy, 2. Around this central portion A I may place lines of stitching, 73, 73, that I may pass for security through reinforcing strips, 53. If the folded parachute canopy takes a four cornered shape, these reinforcing strips and seams preferably form a quadrilateral. At the edges of this portion A, outside the quadrilateral are located the skirts. Preferably the skirts are placed outside the quadrilateral and are free from the canopy, except at one edge. Diagonal strengtheners 54, may be added. When these seams are used, the strengtheners may extend to the places of folding over of the protecting portion of the canopy to cover the sides of the folded up canopy; in Fig. 5 the lines d, d, d, d, indicate the lines on which approximately these folds are made.

These skirts, in the form of my device illustrated, are marked 58, 58, lying on two of the opposite sides of the central portion A and those marked 59, 59, lying at the two other opposite sides. When the parachute canopy is folded, these skirts will lie at its sides, and protect it from damage. The skirts 58, 58, are extended, in the device illustrated, sufficiently widely so that a portion 65, 65 will be positioned back of the folded parachute, the folding being substantially along line a. The skirts 59, 59, similarly are wide enough to provide a portion 66, 66, that will be positioned back of the folded parachute, this folding being substantially along the line b. In order completely to protect the folded parachute, the skirts 59, 59, may be provided with end extensions 57, 57, 57, 57, that, when the reinforcing portion of the canopy is positioned to protect the folded parachute, will fold substantially on the lines e, e, and lie between the skirts 58, 58, and the folded canopy. When folded over as above described and illustrated, each of the grommets 56, 56, will register with a grommet 55, 55. Other retaining means may be used in place of these grommets. The locking cones 50, 50, pass through these grommets or other retaining means and when locked by the insertion of the locking pin 34, in the hole 48, hold the skirts 58, 58, 59, 59, together and also to the support by which the canopy is carried, as will be hereinafter described. The parachute canopy is folded in any convenient manner. In practice I fold it accordionwise and so that the folds will not be too wide to be covered and protected by the reinforcing portion 1. The locking cones 50, 50, in practice, are attached to the canopy preferably near the corners of the quadrilateral formed by the reinforcements 53, 53. However, the cones may be attached to the other parts of the canopy. I attach the cones so that they will be quite free to be entered into the grommets 55 and 56 or other retaining means, and the grommets on the support, and may use very advantageously for this purpose the strips 51, that may lie at the sides of the folded canopy and aid in retaining the parachute in a desired position.

These strips 51, carry the locking cones 50, at their free ends. In order to prevent them from binding, caused by being retracted sidewise, I prefer to fasten these locking cones to the strip 51 by passing the end of the latter through the retainer 49, positioned beneath the base of the cone. An elastic retraction device, in practice a rubber cord 52 is provided. This elastic may be used without the strip 51, but the springing of the folded canopy may in most cases be best controlled by making the strip 51 inelastic, and, also, an inelastic strip will tie the central portion A, directly and solidly to the support from which the parachute is carried.

Cones 50 may use a compression spring 90 to eject them from the retainers or other springing means may be substituted.

Figure 6:
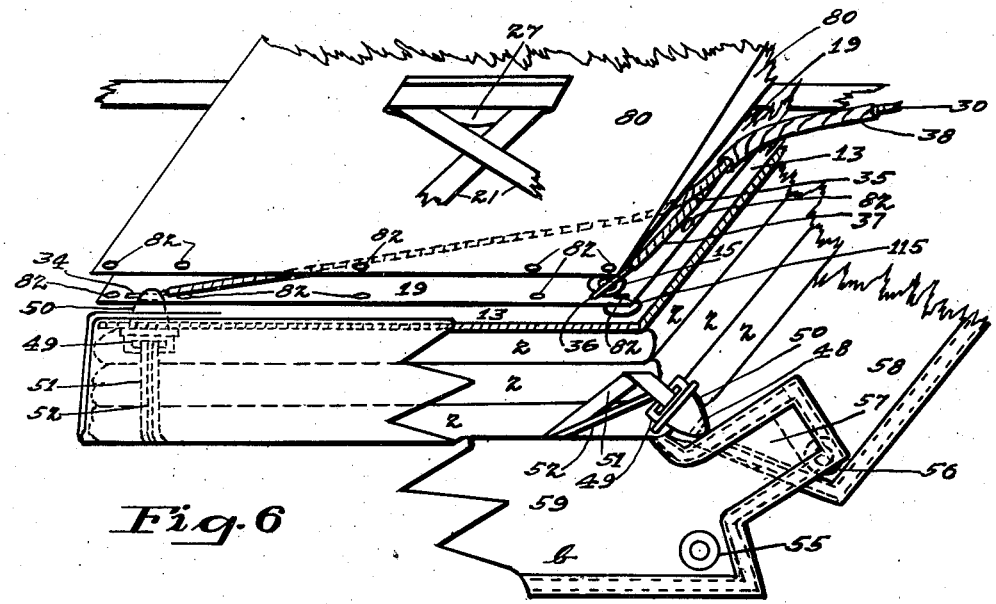
Fig. 6 shows a sketch indicating the position of the locking cone relative to the locking pin, the cushion and the folds of the folded parachute.
Figure 2:
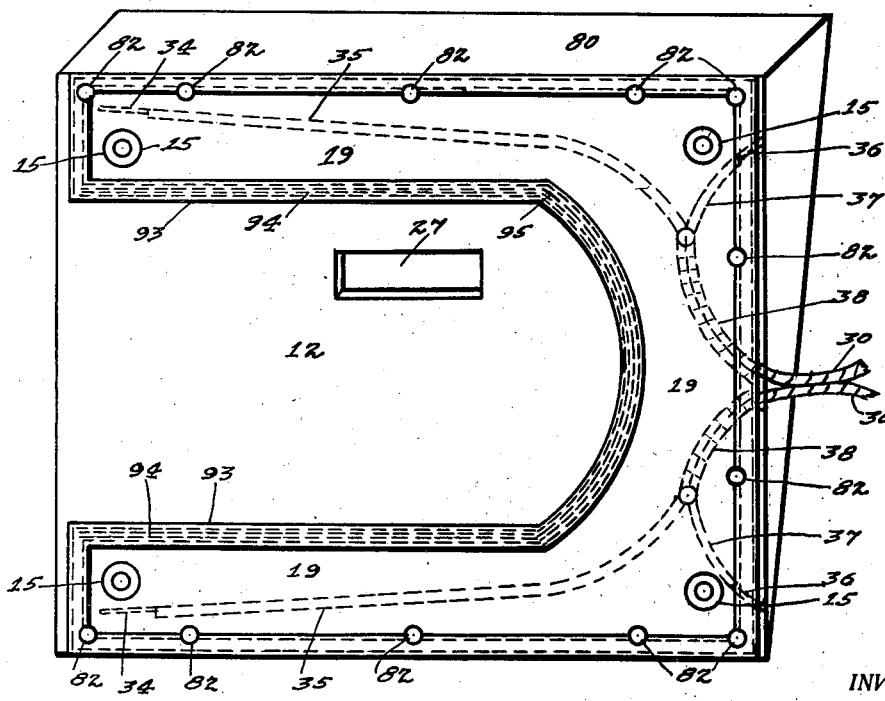
Fig. 2 is a bottom plan of the aviator's cushion that forms the support by means of which the parachute is carried by the aviator.

The support from which the parachute is carried, is, in the form of my device which I have illustrated and am now disclosing in detail, the aviator's cushion 80, which has an inner cover 12. The bottom of the cushion which carries the parts co-operating with the other fastening means—the locking cones 50—is illustrated in Fig. 2. In the form shown, a supplementary cover 19, is provided which is attached, partly by a series of stitchings 93, 93, which may be provided with a reinforcement 94, through which and the supplementary and main covers the stitching may run, and may be detachably secured to the cushion cover by the snaps 82, 82. This supplementary cover 19, is shown in a very convenient construction and shape. As shown, it extends on three sides adjacently to the edges of the cushion, but at the other side, is largely cut away. This incutting serves several purposes. It leaves the opening 27, in the cushion free, and by sewing around the incutting, the line of stitching is longer and hence stronger and is brought nearer the outside edges of the piece, 19. The portion of the cover 19, between the lines of stitching 93, 93, and the edges is foldable back so that the manipulation of the releasable fasteners may be facilitated and the parachute fastened quickly and easily to the cushion. The illustration shows a form of cushion that is new and very convenient especially through adding to the aviator's comfort, but I do not limit myself to such a cushion especially because other forms may be used such as that illustrated in Fig. 11, or, even differing still more widely from that shown in Fig. 2 and other figures of my drawings, without departing from my invention. After the pins 34, 34 and 36, 36, have been inserted in the cones 50, the snaps 82, 82, may be snapped closed and the cover 19, and the portion of the inner cover 12, that is not covered by the former, may present a substantially flat surface, substantially free from projections, and is adapted to lie flat against any flat surface that rests against it and offer no obstruction to the removal of the stowed load cords or other portions of the parachute assemblage that might lie between it and the folded canopy of the parachute. I prefer to make the rip cords 30, in pairs, and to protect them with housings 38, and to let them branch into branches 35 leading to two similarly placed fasteners and into branches 37, leading to the other similarly placed fasteners. I place these rip cords entirely between the extra cover 19, and the under cover 12, of the cushion 80, so that they will preferably be covered completely by the cover 19, and cannot catch on any portion of the parachute, nor hinder its get-away from its support, nor be themselves prevented from acting when the rip cord is pulled. An important use of the extra cover 19, is, as it is a portion of the cushion 80, to hold the cushion and the canopy firmly in their proper relative positions at all times when the canopy is in a folded positon. As the cushion 80, is both firmly and readily releasably secured to the canopy, it acts as a protecting means to insure against displacement of the releasing devices by any cause whatsoever, holding and retaining the portions of the releasing device carried by the support in their proper position at all times, yet capable of allowing them to separate instantly when the releasing means is operated by the aviator.

I prefer to place between the folded pack and the support a stiffener 13. I have shown this stiffener in Figs. 3, 4 and 11; ordinarily it does not extend quite to the edge of the cushion 80, when the latter is used as a support for the parachute. This stiffener may be a flat sheet, usually of metal, or a canvas pocket suitably stiffened by wire or other suitable means, having the holes 115, 115, 115, 115, or other suitable retainers, through which locking cones 50, pass to reach the grommets 15, in the cover 19. These cones 50 preferably are the sole means of holding the stiffener in position relative to the support and the canopy, and when they are drawn out from the holes 115 by the tension device, the entire assemblage of parachute canopy, stiffener 13, and cushion 80, separate automatically. I find that the cones 50, should be loose in the holes 115. They may be supported at one point by an edge of the wall of the hole, but their withdrawal by the elastic or compression means should not be delayed by making these holes small in size so that the cones will bind in them. Each of the cones 50 passes through the grommets 55 and 56 and 15 (and the holes 115 when the stiffener is used) and is pulled by the elastic 52 or compression spring 90 against the face of the grommet 15 lying against the cushion. The elasticity of the folded canopy tends to push apart the part A of the canopy and the supporting means and at the same time co-operating with the action of the springing means of the cone assembly. Upon the removal of the pin from the cone the latter will be drawn completely out of the grommets by the elastic 52, or compression spring 90, and no possibility exists of any grommet catching on the cones. I prefer not to depend upon the rigidity of the cushion, but to maintain the shape of the folded canopy, and keep the cones properly spaced from each other by the stiffening device 13, or other suitable stiffening means.

Figure 3:
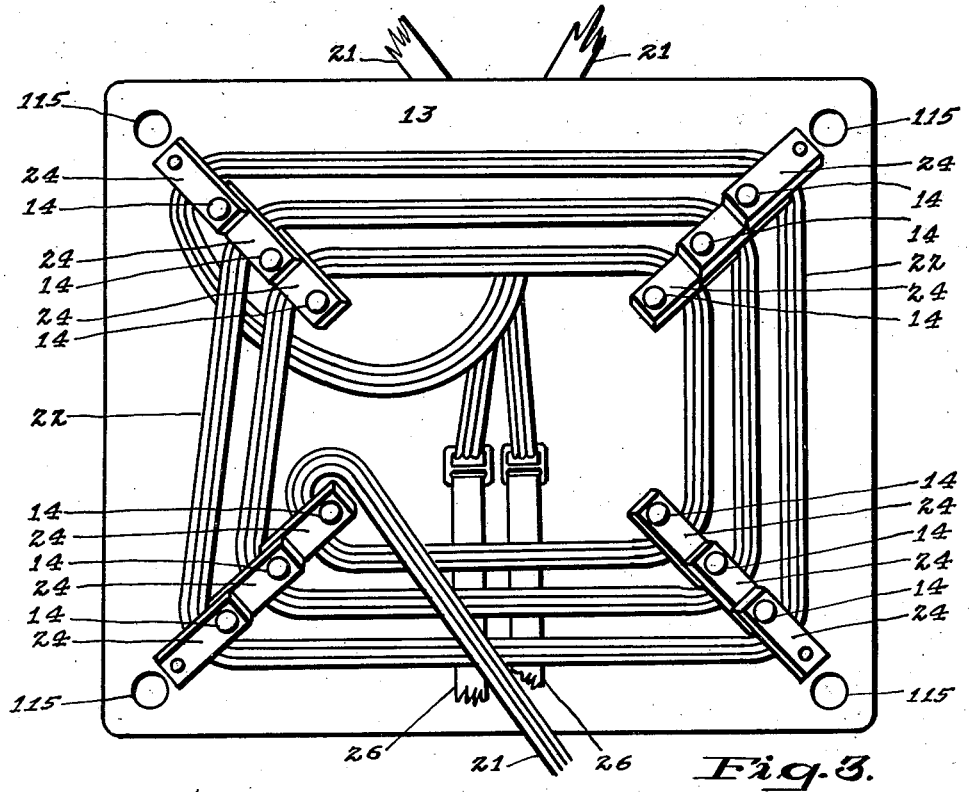
Fig. 3 is a plan of the side of the stiffener away from the cushion with the bundled load cords releasably secured thereto.
Figure 4:
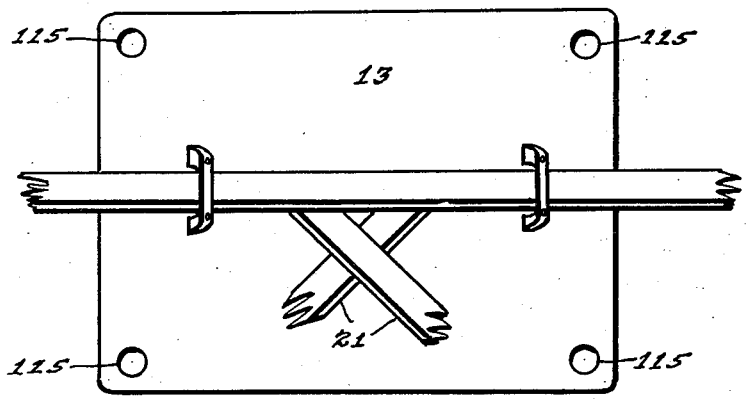
Fig. 4 is a view of the opposite side of the stiffener.

A very convenient means of stowing the cords may be contrived by using the face of the stiffener 13, that lies adjacent to the folded canopy as a support for the load cords 22. These load cords may be bundled and then coiled very conveniently into a quadrilateral coil as shown in Fig. 3. Diagonal retainers 24 as shown in this figure will hold these bundles taut; the end 21 of the bundled cords may go to the canopy and the other end may be attached to the lift webs 26, 26, which reach the harness. The retainers 24, may be releasably secured to the plate by the snappers 14, 14.

The canopy may be made with many differing contours and in many different constructions. I believe, however, the square canopy 2, I have illustrated is the best for use. The load cords may be carried over the top of the canopy 2 and covered by reinforcing strips 11 and 12, sewed over these cords and the border hem 20, may be supplied. The reinforcing portion 1, is shown in the lower right hand corner. Load cords 8 and 9, may be provided running diagonally across the canopy from corner to corner and transverse load cords 7, 7, and 10, 10, may extend across the canopy from side to side, crossing each other at right angles.

While I have described with great particularity the details of a specific embodiment of my invention to enable a person desiring to practice my invention to do so most readily and in the best form of construction of which I am at present aware, I do not limit myself to less than I set forth in the following claims.

I claim:—
1. A parachute canopy having at the peripheral edge thereof, a reinforcing portion of flexible material and locking cones with springing means attached thereto and also attached to the canopy.

2. An assembly comprising a parachute canopy and its load cords, and an aviator's cushion, detachable fastening means for securing the cushion and canopy together, consisting of co-operating elements, positioned in part on the cushion and having their co-operating parts attached to the canopy and a stiffener positioned between the cushion and canopy and held in position by the detachable fastening means.

3. A parachute canopy having a reinforced portion of flexible material having a central portion and free skirts, in combination, when said canopy is folded, with an aviator's cushion, and with fasteners detachably joining the cushion and canopy and comprising co-operating elements, one set of co-operating elements being positioned on the cushion, and the other attached to the canopy, the latter comprising straps each permanently secured at one end to the canopy, and provided at the other end with a locking cone and having elastic retracting devices that are also attached to the canopy, and at their free ends to a cone, and means for engaging with the cones, said means being positioned on the cushion.

4. The device as defined in claim 3, in combination with a stiffener positioned between the cushion and the canopy and provided with apertures for the passage therethrough of the locking cones.

5. A parachute assemblage comprising a folded up canopy, covered on all sides by a reinforced portion of the canopy and having free skirts folded over the sides of the parachute, an aviator's cushion, and detachable fastenings connecting together the cushion and the canopy composed of co-operating elements, one kind of such elements being attached to the canopy and the other kind of such elements, co-operating with the first kind, being attached to the cushion.

6. The assemblage defined in claim 5, in combination with a stiffener, positioned between the cushion and folded canopy, and provided with abutments for spacing the detachable fastenings relatively to each other.

7. A parachute comprising a canopy having a reinforced portion positioned near the periphery of the canopy, said reinforced part having a central portion and free foldable skirts, foldable longitudinally of the skirts into two parts, one adjacent to the fixed central portion of the reinforced portion of the canopy, and one away from the central portion, the latter portion of each skirt being provided with retainers for the cones, registering with retainers in the skirt next to it when the skirts are folded on each other.

8. A parachute assemblage comprising a folded canopy with its load ropes, a cushion, and means for securing detachably the canopy and cushion to each other, the cushion having a lining that carries elements of said fasteners engaging with co-operating elements of said fasteners joined to said canopy, said lining being sewed to the cushion along a portion of the lining and detachably secured to the cushion along its remaining portion.

9. A parachute assemblage comprising fasteners, a folded canopy, a cushion, detachable connections for connecting releasably the folded canopy and cushion, a stiffener, detachably positioned and held between the cushion and folded canopy by the fasteners, load ropes detachably coiled upon the face of the stiffener opposite to that next the cushion, and detachable holders for said coils.

10. In a parachute assemblage comprising a parachute canopy and its load cords, and a support for the canopy and cords, a cushion having a sheet of flexible material, sewed at the inner portion of said sheet to the cushion, and releasably fastenable to the cushion, at its outer edges, and fastening means for securing the canopy to the support comprising locking cones permanently attached to the canopy and means for securing the cones to said sheet, said means being permanently attached to the sheet of flexible material.

11. A parachute assemblage comprising a parachute canopy having a reinforced portion and its load cords, a cushion having a sheet of flexible material, having a cut in portion at one of its sides and sewed to the cushion around this cut in portion, and having its other sides free, fastening means consisting of locking cones attached to the canopy, grommets positioned at the corners of the sheet to receive the locking cones when the parachute is folded, and means for releasably holding the locking cones releasably attached to the cushion.

SAMUEL H. KNIGHT.